Oct. 25, 1966   H. A. FOSS   3,280,726
CONTROL MEANS FOR FRUIT JUICE EXTRACTOR
Filed Nov. 5, 1964   2 Sheets-Sheet 1
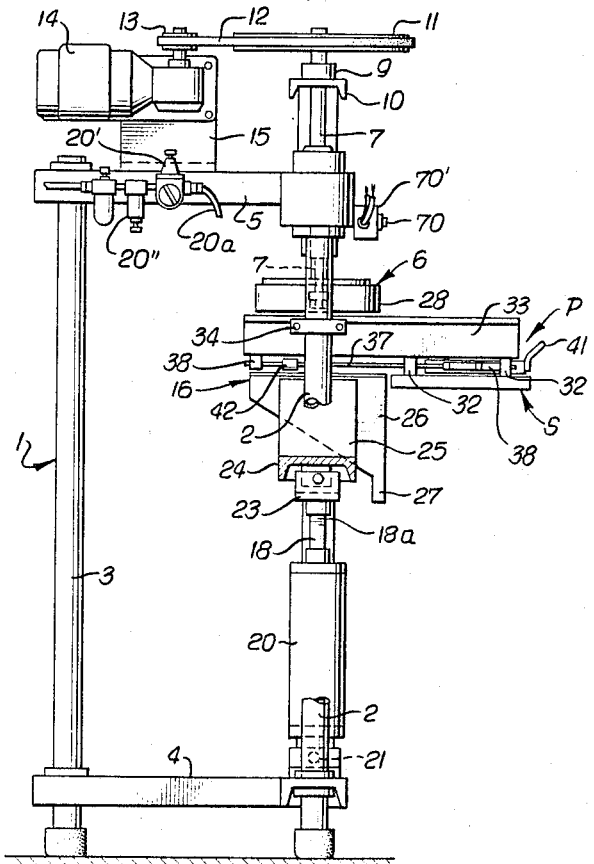
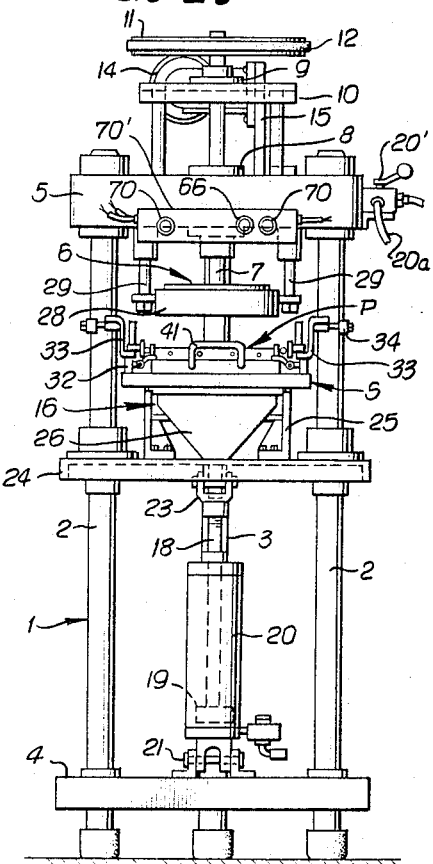
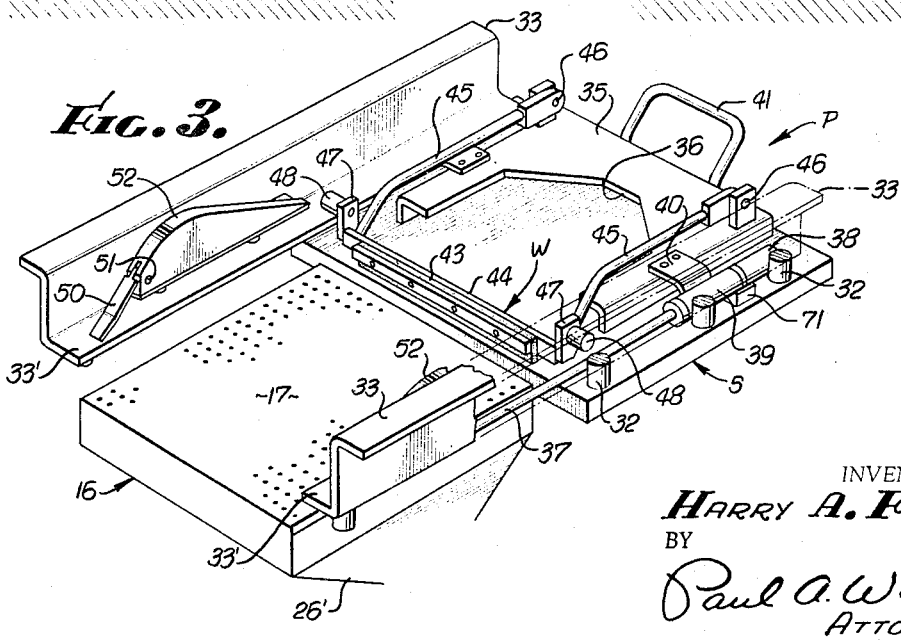
INVENTOR.
HARRY A. FOSS
BY
Paul A. Weilein
ATTORNEYS

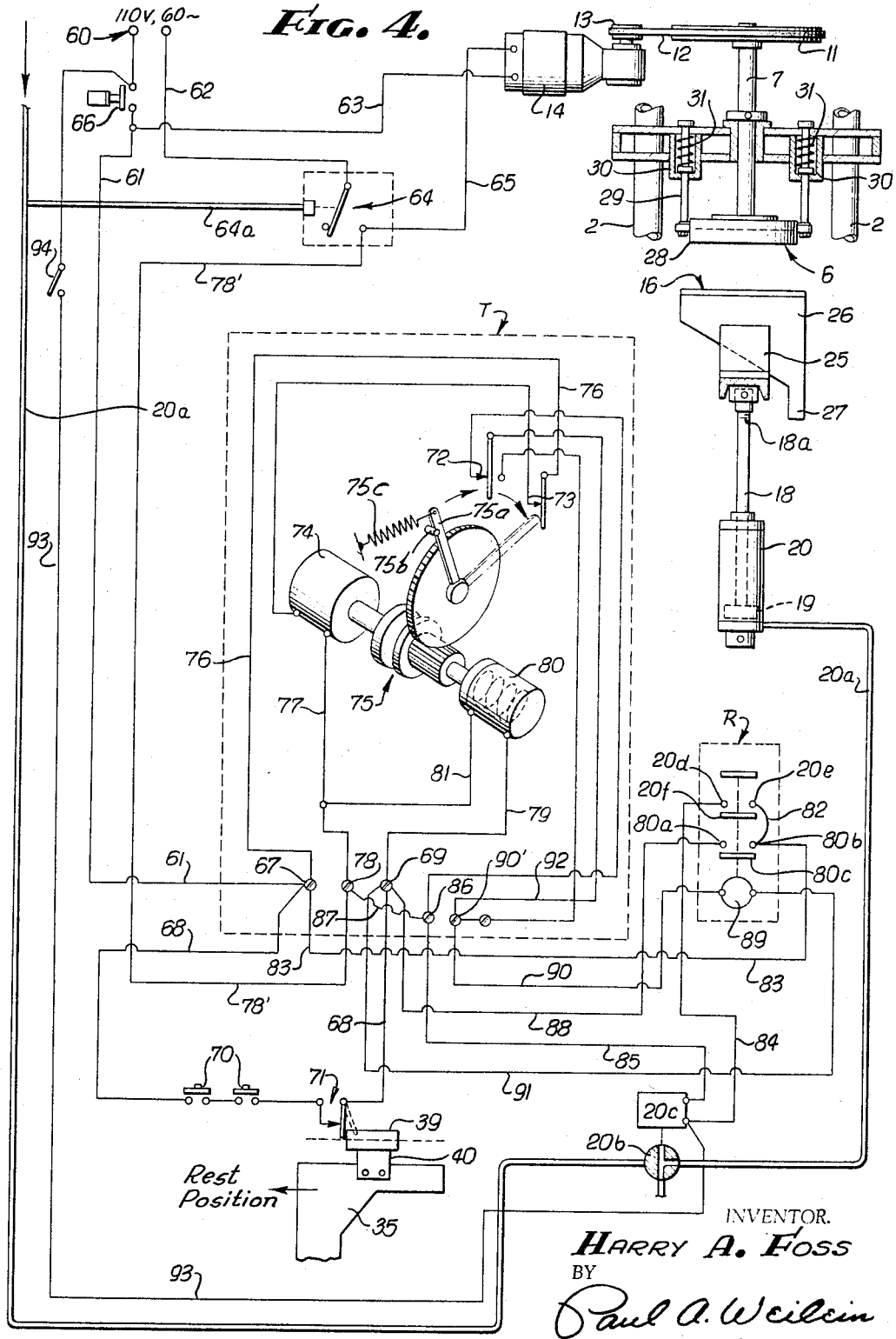

3,280,726
CONTROL MEANS FOR FRUIT JUICE
EXTRACTOR
Harry A. Foss, Granada Hills, Calif., assignor to Brown Citrus Machinery Corp., Whittier, Calif., a corporation of California
Filed Nov. 5, 1964, Ser. No. 409,179
10 Claims. (Cl. 100—49)

The present invention relates to juice extracting machines for removing juice from citrus fruit and more particularly to a juice extractor of the type which is primarily adapted for use in extracting juice from a representative number of fruit taken from a given batch or crop to ascertain certain qualities of the juice of the representative sample.

A typical fruit juice extractor of the type referred to above is so constructed that the fruit halves are subjected to juice extracting pressure between a pair of members, one of which is rotated to effect rotation of a fruit half and the other of which is a perforated grid through which the juice may pass. A fruit half is placed in position between the pressure members with a cut face down on the grid, and control means is employed to maintain pressure on the fruit between the members for a predetermined period of time.

In order for the sampling of the fruit characteristics to be efficient, it is necessary that there be means for accurately controlling the period during which pressure is applied to the fruit. In addition to the foregoing, it is necessary that the respective fruit sections be successively located in the same position relative to the pressure applying means and that the pressure be uniform as regards the successive fruit sections.

The present invention is particularly concerned with the problem of applying a uniform pressure for predetermined and like periods of time to successive fruit sections, the period of pressure application having been determined to be a significant factor in the uniform sampling of fruit from fruit crops in different geographical areas and tested in different facilities.

An object of the present invention, therefore, is to provide control means for controlling the period of pressure application to fruit sections in pressure applying juice extractors of the type referred to above.

More particularly, an object of the invention is to provide means which accurately times the period during which pressure is applied to the fruit sections and which upon lapse of the desired period will automatically cause the cessation of pressure application.

A further object is to provide accurate timing means in accordance with the previous object which will effect cessation of pressure application to the fruit, notwithstanding an operator's continuing to maintain in an operative position switch means operated to initiate application of pressure, with the result that machines equipped with the present invention may be employed in various geographical locations to test different fruit crops with a uniform pressure applied through a predetermined and standard period.

Yet another object of the invention is to provide in a control system as aforesaid means whereby the control system may be overcome to cause the pressure applying members to be moved into pressure applying position and to remain in such position for a desired period of time so as to enable adjustment of the clearance between the pressure applying members whereby to facilitate the application of uniform pressure to the successive fruit sections.

Other objects and advantages of the invention will be hereinafter described or will become apparent to those skilled in the art, and the novel features of the invention will be defined in the appended claims.

In the accompanying drawings:

FIG. 1 is a view in side elevation illustrating a machine to which the present invention is applicable;

FIG. 2 is a view in front elevation of the machine of FIG. 1;

FIG. 3 is a fragmentary view in perspective with certain of the parts broken away illustrating means for positioning the fruit sections on a fruit receiving grid; and FIG. 4 is a schematic view illustrating the present invention as applied to the pressure applying members of the machine of FIGS. 1–3.

Like reference characters in the several views of the drawings and in the following description designate corresponding parts.

Referring more specifically to the drawings, it will be seen that a juice extractor embodying the present invention includes an upright skeleton frame 1 made up primarily of a pair of front legs 2 and a rear leg 3 centered behind the front legs and joined thereto by means of T-shaped cross members 4 and 5. The member 4 is located near the lower ends of the legs, whereas the member 5 is located at the upper ends of the legs. With this arrangement the frame 1 supports all of the working parts of the extractor as a compact and portable unit which readily may be transported from place to place.

In accordance with this invention the frame 1 supports a pair of pressure members which are relatively movable while one of the members is rotatable. When relative movement of these pressure members is effected while one member is rotated, a fruit half between these members will be subjected to the desired juice extracting pressure.

The rotary pressure member designated 6 is preferably circular and fixed on the lower end of a rotary shaft 7 mounted in a suitable bearing 8 carried by the cross member 5. The shaft 7 extends above the cross member 5 through a second bearing 9 supported by an upright extension 10 of the member 5. A pulley 11 on the shaft 7 is driven by belt 12 from a drive pulley 13 operated by a motor 14 mounted on a bracket 15 extending upwardly from the cross member 5.

The other pressure member designated 16 may be of rectangular form and includes a flat and perforated fruit-supporting plate 17.

Means are provided for vertically moving the movable perforated pressure member 16 toward and away from the rotary pressure member 6 and may consist of a piston rod 18 having a piston 19 thereon operable in response to fluid pressure in cylinder 20 pivoted as at 21 on the cross member 4. The upper end of the piston rod 18 is connected by a thread 18a to a universal joint 24 vertically slidably mounted on the legs 2 and connected with the pressure member 16 by means of a pair of brackets 25. With this arrangement, the piston 19 and rod 18 may be moved upwardly as the slide member 24 is moved upwardly on the legs 2 and thereby moves the perforated pressure member 16 upwardly to occupy a position adjacent the rotary member 6 for applying juice extracting pressure to a fruit half supported on the member 16. The thread 18a is illustrative of one adjustable connector means which will enable adjustment of the clearance between the pressure members 6 and 16.

A funnel member 26 is fixed to the underside of the member 16 between the brackets 25 and has a discharge spout 27 whereby juice extracted from the fruit will gravitate through the perforations in the member 16 into the funnel for discharge through the outlet 27 into a suitable container, not shown.

A splash guard (see FIG. 4) in the form of an annular band or ring 28 is fixed on the lower ends of rods 29 vertically yieldably supported in sockets 30 on the cross member 5 so that the guard 28 is positioned in surrounding relation to the member 6 for contact with the perforate plate 17 when the member 16 is moved into juice extracting position. Springs 31 are mounted in the sockets 30 so as to bias the rods 29 downwardly to hold the guard 28 in position to contact the member 16 in advance of the pressure member 6, the guard 28 then yielding upwardly by reason of the springs 31 so that the two pressure members may be moved into the desired pressure applying position.

The pressure members 6 and 16 are constructed and operated so that all of the juice will be extracted from each fruit half without shredding the rind and pulp in such a manner that the shredded particles may cause clogging of the perforations in the member 16 and interfere with recovery of all of the extracted juice. Accordingly, the opposed faces of the pressure members 6 and 16 which contact the fruit are substantially flat since conical fruit engaging members would cause gouging and maceration or shredding of the rind and pulp, without necessarily expressing all the juice from the fruit half and the plup. In addition, it is preferable that the fruit contacting surface of the member 6 be yieldable when engaged with the fruit.

A factor essential to the desired extraction operation is the positioning of each fruit half regardless of size at substantially the same location on the movable pressure member 16, it being desired to position each fruit half substantially opposite the center of the rotary pressure member 6. For this purpose, positioning means P are provided in operative association with a shelf or platform S, which latter is suitably secured by members 32 beneath Z-bars 33 in turn secured by clamps 34 on the legs 2 and projecting horizontally therefrom past and on opposite sides of the pressure member 16. With this arrangement, the platform S will be disposed to one side of the pressure member 16 with the upper surface thereof in alignment with the upper surface of the pressure member 16 when the latter is in lowered or retracted position. The positioning means P as here shown is manually movable from retracted position over the upper surface of the platform S for moving the fruit half into a predetermined position on the member 16. In addition, wipe-off means W is provided as a part of the positioning means P and is arranged to sweep over the upper surface of the pressure member 16 to remove rind and other residual matter resulting from an extracting operation, in advance of the operation of positioning a fruit half on the member 16. This arrangement of the wipe-off means W is such that by the time the positioning means has centered a fruit half on the member 16 the rind and residual matter will have been swept off the member 16.

With reference to FIG. 3, it will be seen that the positioning means P includes a slidable fruit positioning member or plate 35 of generally rectangular form having a generally U-shaped notch 36 therein for embracing a fruit half on the platform S so as to center the half in the notch whereby upon movement of the plate over the pressure member 16 the fruit half will be disposed in the desired position on the pressure member.

Means are provided for slidably supporting the fruit positioning member or plate 35 for movement above and clear of contact with the platform S and member 16 and includes a pair of rods 37 that extend beneath the bottom flange 33' or the Z-bars 33 and are secured to the underside of these flanges by brackets 38. Sleeves 39 fixed by brackets 40 on opposite sides of the slide plate 35, as shown in FIG. 3, are slidable on the rods so that the plate is slidably supported slightly above the upper surface of the platform S for free movement over and from the movable pressure member 16. A handle 41 on the plate 35 may be grasped to move the plate for positioning a fruit half on the pressure member 16 and for retracting the plate back over the platform S.

When the slide plate 35 of the positioning means P is moved into fully retracted position, ends of the sleeves 39 abut mounting members 38 for the rods, as shown in FIG. 3, to limit retraction movement of the plate. When the plate 35 is moved to the final position in which the fruit half is centered on the member 16, sleeves 39 engage a stop 42 mounted on the rods 37 to limit forward movement of the sleeve to the fully extended position. It should be noted that the plate 35 operates in a plane above that of the platform S and member 16 so that when the cut face of a fruit half is rested on a platform in the recess 36, the edges of the plate defining the recess 36 will contact the fruit half above the bottom or cut face thereof to assure that the fruit half will be centered in the recess and moved readily into centered position onto the pressure member 16 with its cut face downmost.

The wipe-off means W includes a wipe-off blade 43 supported on a cross bar 44 mounted on the ends of arms 45 which latter are pivoted as at 46 on the plate 35. The bar 44 has upstanding end portions 47 thereon mounting rollers 48 which are disposed to roll on the top of the bottom flanges 33' of the Z-bars 33, as the positioning means is moved from between retracted and extended positions. The wipe-off blade 43 may be made of sponge rubber or other suitable elastomeric material so as to reliably sweep the spent fruit halves and other residual matter from the perforated surface of the pressure member 16. This blade 43 is normally gravitationally disposed in down position resting on the upper surface of the platform S. Upon movement of the plate 35 to a fruit positioning location, the rollers 48 will pass under trip members 50 that are pivoted as at 51 on cam members 52 fixed on the flanges 33'.

When the plate 35 is retraced the rollers 48, in being ahead of the trip members 50, will ride over these members and then ride over the tops of the cam members 52, thereby elevating the wiper blade 43 and the pivoted arms 45 so as to clear the fruit half which has been positioned on the member 16. When the plate 35 reaches the retracted position shown in FIG. 3, the rollers 48 will have moved down off of the cams 52 onto the flanges 33' and the wipe-off member 43 will then rest upon the upper surface of the platform S.

In order that a test extractor embodying the present invention be operable to obtain all of the juice per fruit half without shredding the rind and pulp, control means are embodied in the extractor for maintaining the reciprocable pressure member 16 in juice extracting position relative to the rotary pressure member 6 for a predetermined period of time, say three or four seconds, while the rotary pressure member is rotated. Moreover, the rotary pressure member 6 should be slowly rotated, for example, at a rate of about 33 r.p.m. This rate of rotation may be provided for by the gear reduction unit associated with the motor 14.

In addition, it is desired that another control means be provided to prevent upward movement of the pressure member 16 at any time that the positioning means P is moved from fully retracted position and for permitting the member 16 to be elevated only while the positioning means P is in fully retracted position. Also, means should be provided in accordance with another feature of the invention for enabling adjustment of the clearance between the pressure members 6 and 16 while the latter are in pressure applying positions.

These control and operating features are preferably availed of by the fluid pressure operating and electrical time controlled system of FIG. 4.

As seen in FIG. 4, fluid under pressure is adapted to be supplied to the cylinder 20 through a conduit 20a to effect elevation of the piston 19 and rod 18 and consequent elevation of the pressure member 16. Within the conduit 20a is a normally closed valve 20b adapted to prevent the passage of fluid pressure to the cylinder 20 when closed, but to exhaust the cylinder to atmosphere. Valve 20b is operable by a solenoid designated 20c and circuitry is provided for operating the solenoid 20c to open valve 20b for a predetermined and controlled period of time which is determinative for the period of pressure application to a fruit section between the pressure member 16 and the rotary pressure member 6. A main power air control valve is employed as at 20' and pressure may be controlled by a regulator 20" (see FIGS. 1 and 2).

This circuitry is adapted to be connected to a source 60 and includes first and second conductor leads 61 and 62. Connected to lead 61 and leading to the motor 14 which drives the rotary pressure member is a lead 63, while lead 62 from the source is connectable through a switch denoted at 64 to a conductor 65 also leading to the motor 14 so that upon closure of the switch 64 the motor 14 will be energized. Preferably, however, there is interposed in the lead 61 ahead of conductor 63 a main shut-off switch 66 which may be key operated. Switch 64 is adapted to be closed by fluid pressure derived from the conduit 20a by a branch conduit 64a. Thus, it will be understood that the switch 64 will be closed only when there is sufficient air pressure to actuate the piston 19 in cylinder 20 and apply the desired pressure to a fruit section. Assuming that such pressure exists and that the shut-off switch 66 is closed, it will also be understood that the motor 14 will run continuously so as to effect continuous rotation of the rotary pressure member 6.

The source lead 61 is connected at 67 to a post of a timer mechanism which will be hereinafter more fully described and there is a conductor 68 also connected with the post 67 and leading to a second post 69 of the timer mechanism, this conductor 63 having therein at least one but preferably a pair of manually operated switches 70 which are normally open and which are adapted to be manually held closed. Also in the conductor 68 is a normally open switch 71 which, as diagrammatically illustrated, is adapted to be actuated to a closed position by one of the sleeves 39 by which the positioning plate 35 is slidably supported on the support rods 37. The switch 71 is so located that it will be closed when the positioning means P is fully retracted to an out-of-the-way position as shown in FIG. 3. At all other positions of the positioning means the switch 71 will be open.

The timer mechanism referred to above is generally denoted at T and is a typical electric motor-operated recycling timer adapted to be set for different time intervals, and the timer mechanism is adapted to control the opening and closing of the above mentioned valve 20b, responsive to the closure of the manual switches 70, and the timer and the associated circuitry are such that the period of pressure application cannot be over extended by the operator's maintaining the manual switches closed.

Therefore, the timer mechanism includes a first switch 72 and a second switch 73, both of which switches are normally closed but which are adapted to be opened by the timer mechanism upon the lapse of a preselected time interval, as is well known in the art of electric time controlled mechanisms. An example of a time control mechanism useful in the present invention is product TOAB of the Industrial Timer Corporation.

Such timers include, as diagrammatically illustrated in FIG. 4, a timer motor 74 and a solenoid operated clutch 75, which, when engaged will drive a sweep member 75a from a normal position engaged with a stop 75b through an arc so that it will actuate switch 72 and then switch 73. When the clutch 75 is disengaged the member 75a will automatically return to a starting position under the influence of spring 75c. The circuitry for the timer includes a conductor 76 leading from the post 67 referred to above and, hence, being in circuit with the source lead 61. This conductor 76 has therein the normally closed switch 73 which, when closed, completes the circuit leading to the timer motor 74. Leading from the timer motor 74 is a conductor 77 connected to a post 78 and from the post 78 extends a conductors 78' leading to the normally open but fluid pressure closed switch 64 and thence to the source lead 62 when the switch 64 is closed.

Clutch 75 is adapted to be engaged when a circuit comprising a conductor 79 is energized, this conductor 79 being connected to the timer post 69 and hence to the source lead 61 through the conductor 68 and post 67. The conductor 79 leads to a solenoid coil 80, the coil being in turn connected by a conductor 81 to the above noted conductor 77 and hence to post 78 and through switch 64 to the source lead 62. It will now be understood that if switches 64, 70, and 71 are all closed, the timer motor 74 will be energized as will the clutch solenoid coil 80 so that the clutch 75 will be engaged to cause the ultimate opening of the normally closed switch 72 and, under some circumstances, the normally closed switch 73 with consequent deenergization of both the clutch coil 80 and the timer motor 74.

Means are provided for opening the solenoid valve 20b upon energization of the timer motor and clutch solenoid coil 80 and such means comprises a holding relay generally denoted at R whereby upon energization of the clutch timer motor and clutch solenoid coil, the latter will remain energized for the predetermined and desired period of time, notwithstanding opening of the manual switches 70.

Accordingly, the holding relay R is diagrammatically illustrated as having a pair of solenoid valve contacts 20d and 20e and a pair of clutch contacts 80a and 80b and it will be noted that the respective solenoid valve and clutch contacts 20e and 80b are interconnected by a series conductor 82. Connecting the just-mentioned contacts 20e and 80b to the source lead 61 is a conductor 83 leading from the contact 80b to the post 67 of the timer.

Leading between the solenoid valve contact 20d and the valve solenoid 20c is a conductor 84, the other side of the circuit for solenoid 20c comprising a conductor 85 leading from the solenoid 20c to a post 86 of the timer which is connected with the source lead 62 by means of a conductor 87 leading from the post 86 to the post 78.

Leading from the clutch contact 80a is a conductor 88 which is connected to timer post 69 and hence to clutch solenoid coil 80 through the conductor 79, the other clutch contact 80b being, as previously mentioned, connected to the source lead post 67 by the conductor 83.

The relay R includes a holding coil generally denoted at 89 and, as is apparent to those skilled in the art, will be energized upon initial closure of the manual switches 70 and will hold a solenoid valve switch element 20f and a clutch solenoid switch element 80c of the relay in engagement with their respective contacts. The holding coil 89 is connected to the source circuit at the posts 69 and 78 by means of conductor leads 90 and 91, respectively. It will also be noted that the time operated switch 72 referred to above is interposed in the conductor 90, the latter being connected to a post 90' to which is also connected a switch conductor 92 including the switch 72, the conductor 92 leading to the above noted post 86 and thence via the conductor 87 to the post 78.

It will now be understood that following initial closure of the manual switches 70, the holding relay will maintain the circuit leading to the coil 80 of the clutch operating solenoid whereby to effect and maintain engagement of the timer clutch 75 to thereby effect a drive between the timer motor 74 and the typical mechanism employed in such timers for opening the switches 72 and 73 following the set period of time.

In order to protect the timer motor 74, the time operated switch 73 is adapted to be opened a brief instant following opening of switch 72 so that the circuit to the timer motor will not be overloaded even though an operator may maintain the manual switches 70 closed which would, of course, result in the maintenance of the circuit to the solenoid coil 80 of the clutch 75. Opening of the switch 73 would ordinarily, in the timers of the type here involved, result in the automatic resetting of the time cycle, but when the manual switches 70 are held closed such resetting is prevented due to the fact that the clutch 75 would remain engaged. Therefore, when the manual switches 70 are held closed beyond the preselected pressure period and the switch 72 is opened by the timer, the cycling of the machine is interrupted until such time as the manual switches are released, allowing the clutch 75 to disengage and the timer mechanism to reset, at which time the normally closed switch 73 would again be closed.

According to a further feature of the invention, it is desired that the clearance between the rotary pressure member and the reciprocal pressure member 16 be adjustable, for example, at the above described thread 18a on the actuator rod 18. Accordingly, there is included in the circuitry a conductor 93 leading between source lead 61 and the solenoid 20c of the solenoid valve, the conductor 93 preferably having a switch 94 therein whereby the circuit may be completed to the solenoid valve to open the same and cause elevation of the pressure member 16. The elevated condition of the pressure member may be maintained for the period of time necessary to effect adjustment of the clearance between the pressure members.

From the foregoing, it will now be apparent that the present invention provides a machine for expressing the juice from citrus fruit and the like which is ideally suited for use in the taking of the juice from a representative sample of fruit, each of the cut fruit sections being pressed between the rotary pressure member 6 and the grid or pressure member 16 with a uniform pressure which is a function of a predetermined fluid pressure applied to the actuator piston 19 and for a predetermined period of time controlled by the timing mechanism and circuitry which will control the cycling of the pressure members. Moreover, the circuitry is such that the positioning mechanism must be in a retracted position and the manual switches 70 are preferably so located as, for example, in a housing 70' (see FIGS. 1 and 2) that both of a user's hands must be employed to actuate the switches and his hands will be in a safe position out of the way of the pressure applying members.

While specific structural details have been shown and described, it should be understood that changes and alterations may be resorted to without departing from the spirit of the invention a defined in the appended claims.

I claim:

1. A citrus fruit juice extractor, comprising: a pair of pressure members; means supporting said pressure members for movement one toward and away from the other to apply juice extracting pressure to a citrus fruit section disposed therebetween; means for rotating one of said pressure members; actuator means operable to move one of said pressure members as aforesaid; solenoid means for causing operation of said actuator means; means for operating said solenoid means to maintain said pressure members in engagement with a fruit section therebetween for a predetermined period of time including an electrical circuit for said solenoid; and electric motor driven timer means for energizing said circuit for a predetermined period and for de-energizing said circiut at the end of said period; a fruit section receiving platform spaced from said pressure members; positioning means shiftable from a retracted position relatve to said platform to move a fruit section to a position between said pressure members; said circuit including a normally open switch; and means for closing said switch upon movement of said positioning means to the retracted position.

2. A citrus fruit juice extractor, comprising: a pair of pressure members; means supporting said pressure members for movement one toward and away from the other to apply juice extracting pressure to a citrus fruit section therebetween; means for rotating one of said pressure members; fluid pressure operated actuator means operable to move one of said pressure members as aforesaid; a pressure fluid supply line leading to said actuator means; valve means in said line for controlling the passage of pressure fluid to said actuator means; solenoid means connected to said valve means for operating the same; electric means for controlling said solenoid means to effect operation of said valve means to cause actuation of said actuator means for a predetermined repetitive period; normally open switch means for rendering said electric means operable upon closure of said switch means; said circuit including at least one normally open switch; a holding relay connected to said switch and to said timer means for maintaining operation of said timer means following closure of said switch; timer switch means operable by said timer means and connected to said holding relay to de-energize the latter at the end of said period; and further switch means operable by said timer means following operation of said timer switch means and connected to said timer means for interrupting operation of said timer means when said normally open switch is held closed beyond the end of said period.

3. A citrus fruit juice extractor, comprising: a pair of pressure members; means supporting said pressure members for movement one toward and away from the other to apply juice extracting pressure to a citrus fruit section therebetween; means for rotating one of said pressure members; fluid pressure operated actuator means operable to move one of said pressure members as aforesaid; a pressure fluid supply line leading to said actuator means; valve means in said line for controlling the passage of pressure fluid to said actuator means; solenoid means connected to said valve means for operating the same; electric means for controlling said solenoid means to effect operation of said valve means to cause actuation of said actuator means for a predetermined repetitive period; normally open switch means for rendering said electric means operable upon closure of said switch means; said circuit including at least one normally open switch; a holding relay connected to said switch and to said timer means for maintaining operation of said timer means following closure of said switch; timer switch means operable by said timer means and connected to said holding relay to de-energize the latter at the end of said period; positioning means for moving a fruit section to a position between said pressure members at the end of said period; and means for closing said normally open switch in response to movement of said positioning means to its retracted position.

4. A citrus fruit juice extractor, comprising: a pair of pressure members; means supporting said pressure members for movement one toward and away from the other to apply juice extracting pressure to a citrus fruit section therebetween; means for rotating one of said pressure members; fluid pressure operated actuator means operable to move one of said pressure members as aforesaid; a pressure fluid supply line leading to said actuator means; valve means in said line for controlling the passage of pressure fluid to said actuator means; solenoid means connected to said valve means for operating the same; electric means for controlling said solenoid means to effect operation of said valve means to cause actuation of said actuator means for a predetermined repetitive period; normally open switch means for rendering said electric means operable upon closure of said switch means; and further switch means operable at the end of each predetermined period for interrupting operation of said electric means when said normally open switch means is held closed for a period greater than said predetermined period.

5. A citrus fruit juice extractor, comprising: a pair of pressure members; means supporting said pressure members for movement one toward and away from the other to apply juice extracting pressure to a citrus fruit section therebetween; means for rotating one of said pressure members; fluid pressure operated actuator means operable to move one of said pressure members as aforesaid; a pressure fluid supply line leading to said actuator means; valve means in said line for controlling the passage of pressure fluid to said actuator means; solenoid means connected to said valve means for operating the same; electric means for a predetermined repetitive period; and normally open switch means for rendering said electric means operable upon closure of said switch means; a fruit section receiving platform spaced from said pressure members; positioning means shiftable from a retracted position relative to said platform to move a fruit section to a position between said pressure members, said switch means comprising a switch closable by said positioning means in said retracted position.

6. A citrus fruit juice extractor, comprising: a pair of pressure members; means supporting said pressure members for movement one toward and away from the other to apply juice extracting pressure to a citrus fruit section therebetween; means for rotating one of said pressure members; fluid pressure operated actuator means operable to move one of said pressure members as aforesaid; a pressure fluid supply line leading to said actuator means; valve means in said line for controlling the passage of pressure fluid to aid actuator means; solenoid means connected to said valve means for operating the same; electric means for controlling said solenoid means to effect operation of said valve means to cause actuation of said actuator means for a predetermined repetitive period; normally open switch means for rendering said electric means operable upon closure of said switch means; said electric means including a timer mechanism having a normally closed switch in circuit with said solenoid; means for opening said switch after a predetermined period following closure of said normally open switch means; and further switch means operable by said timer mechanism following opening of said normally closed switch for interrupting operation of said timer mechanism when said normally open switch means is held closed.

7. A citrus fruit juice extractor, comprising: a pair of pressure members; means supporting said pressure members for movement one toward and away from the other to apply juice extracting pressure to a citrus fruit section therebetween; means for rotating one of said pressure members; fluid pressure operated actuator means operable to move one of said pressure members as aforesaid; a pressure fluid supply line leading to said actuator means; valve means in said line for controlling the passage of pressure fluid to said actuator means; solenoid means connected to said valve means for operating the same; electric means for controlling said solenoid means to effect operation of said valve means to cause actuation of said actuator means for a predetermined repetitive period; normally open switch means for rendering said electric means operable upon closure of said switch means; said electric means including an electric motor; a circut for said motor; a solenoid-operated clutch engageable with said motor; a circuit for said solenoid-operated clutch having a normally closed switch; and means operable upon engagement of said clutch with said motor to open said normally closed switch in said solenoid operated clutch circuit following a set period of time.

8. A citrus fruit juice extractor, comprising: a pair of pressure members; means supporting said pressure members for movement one toward and away from the other to apply juice extracting pressure to a citrus fruit section therebetween; means for rotating one of said pressure members; fluid pressure operated actuator means operable to move one of said pressure members as aforesaid; a pressure fluid supply line leading to said actuator means; valve means in said line for controlling the passage of pressure fluid to said actuator means; solenoid means connected to said valve means for operating the same; electric means for controlling said solenoid means to effect operation of said valve means to cause actuation of said actuator means for a predetermined repetitive period; normally open switch means for rendering said electric means operable upon closure of said switch means; said electric means including an electric motor; a circuit for said motor; a solenoid-operated clutch engageable with said motor; a circuit for said solenoid-operated clutch having a normally closed switch; means operable upon engagement of said clutch with said motor to open said normally closed switch in said solenoid operated clutch circuit following a set period of time; and holding relay means in circuit with said solenoid means and with said normally closed switch in said circuit for said solenoid operated clutch for completing the circuit thereto upon closure of said normally open switch means.

9. A citrus fruit juice extractor, comprising: a pair of pressure member; means supporting said pressure members for movement one toward and away from the other to apply juice extracting pressure to a citrus fruit section therebetween; means for rotating one of said pressure members; fluid pressure operated actuator means operable to move one of said pressure members as aforesaid; a pressure fluid supply line leading to said actuator means; valve means in said line for controlling the passage of pressure fluid to said actuator means; solenoid means connected to said valve means for operating the same; electric means for controlling said solenoid means to effect operation of said valve means to cause actuation of said actuator means for a predetermined repetitive period; normally open switch means for rendering said electric means operable upon closure of said switch means; said electric means including an electric motor; a circuit for said motor; a solenoid-operated clutch engageable with said motor; a circuit for said solenoid-operated clutch having a normally closed switch; holding relay means in circuit with said solenoid means and with said normally closed switch in said circuit for said solenoid-operated clutch for completing the circuit thereto upon closure of said normally open switch means; a normally closed switch in said circuit for said motor; and means operable upon engagement of said clutch with said motor to open said normally closed switch in said solenoid-operated clutch circuit following a set period of time following closure of said normally open switch means and for thereafter opening said normally closed switch in said motor circuit when said normally open switch means is held closed.

10. A citrus fruit juice extractor, comprising: a pair of pressure members; means supporting said pressure members for movement one toward and away from the other to apply juice extracting pressure to a citrus fruit section therebetween; means for rotating one of said pressure members; fluid pressure operated actuator means operable to move one of said pressure members as aforesaid; a pressure fluid supply line leading to said actuator means; valve means in said line for controlling the passage of pressure fluid to said actuator means; solenoid means connected to said valve means for operating the same; electric means for controlling said solenoid means to effect operation of said valve means to cause actuation of said actuator means for a predetermined repetitive period; normally open switch means for rendering said electric means operable upon closure of said switch means; means for adjusting the clearance between said pressure members; and a circuit for controlling said solenoid means independently of said electric means to cause actuation of said actuator means for enabling adjustment of said clearance while said pressure members are in pressure applying positions.

References Cited by the Examiner

UNITED STATES PATENTS

| | | | |
|---|---|---|---|
| 2,365,849 | 12/1944 | Strauss. | |
| 2,498,541 | 2/1950 | Galper | 100—93 |
| 2,766,810 | 10/1956 | Gibson | 100—93 X |
| 3,185,071 | 5/1965 | Foss et al. | 100—53 |

LOUIS O. MAASSEL, *Primary Examiner.*

UNITED STATES PATENT OFFICE
CERTIFICATE OF CORRECTION

Patent No. 3,280,726                                  October 25, 1966

Harry A. Foss

It is hereby certified that error appears in the above numbered patent requiring correction and that the said Letters Patent should read as corrected below.

Column 2, line 51, after "joint" insert -- 23 which is in turn connected to a cross member --; column 9, line 3, after "for", second occurrence, insert -- said valve means for operating the same; electric means for controlling said solenoid means to effect operation of said valve means to cause actuation of said actuator means for --; column 10, line 14, for "member" read -- members --.

Signed and sealed this 12th day of September 1967.

(SEAL)
Attest:

ERNEST W. SWIDER                                EDWARD J. BRENNER
Attesting Officer                                        Commissioner of Patents